United States Patent [19]
Makar

[11] Patent Number: 6,130,522
[45] Date of Patent: Oct. 10, 2000

[54] PULSE MODIFIED INVARIANT CURRENT BATTERY CHARGING METHOD AND APPARATUS

[76] Inventor: Dominique G. Makar, 82 Bondar Bay, Winnipeg, Manitoba, Canada, R2P 1B4

[21] Appl. No.: 09/356,365

[22] Filed: Jul. 19, 1999

Related U.S. Application Data

[60] Provisional application No. 60/094,164, Jul. 27, 1998.

[51] Int. Cl.⁷ .................................................. H01M 10/44
[52] U.S. Cl. .............................................................. 320/141
[58] Field of Search .................................. 320/137, 139, 320/141, 145

[56] References Cited

U.S. PATENT DOCUMENTS

| | | |
|---|---|---|
| 5,063,341 | 11/1991 | Gali . |
| 5,166,595 | 11/1992 | Leverich . |
| 5,614,805 | 3/1997 | Momotani et al. .................... 320/139 |
| 5,633,575 | 5/1997 | Gali . |
| 5,648,714 | 7/1997 | Eryou et al. . |
| 5,677,612 | 10/1997 | Campagnulo et al. . |
| 5,684,386 | 11/1997 | Okada .................................. 320/139 |
| 5,808,447 | 9/1998 | Hagino .................................. 320/139 |

OTHER PUBLICATIONS

G.D. Makar—D.C. Charging Systems, Lead Acid Batteries and Pulse Charging, no date.

Battery Council International—Battery Service Manual, no date.

Journal of Power Sources 53 (1995) 215–228—L. T. Lam (14 pages).

Battery Council International—Battery Service Manual (69 pages) no date.

DC Electric Systems, Lead Acid Batteries and Pulse Charging—D. Makar (164 pages), no date.

Lead Acid Batteries—W. J. Glazier (9 pages), no date.

Journal of Power Sources 45 (1993) 171—190—D. Pavlov (20 pages).

Journal of Power Sources 46 (1993) 203—210—M.K. Dimitorv and D. Pavlov (8 pages).

*Primary Examiner*—Edward H. Tso
*Attorney, Agent, or Firm*—Adrian D. Battison; Murray E. Thrift

[57] ABSTRACT

A lead acid battery having at least one electrolytic cell is charged by a method which effects lowering of the internal impedance of the battery plates and increase battery cycle life capacity. The method includes the steps of connecting a current source device across the positive and negative terminals of the battery and applying a periodic pulse to the device so as to apply a pulsed current across the battery terminals without applying a voltage pulse. The pulse current of square wave shape is applied onto a sinusoidal charging current at a higher frequency.

9 Claims, 9 Drawing Sheets

PULSE MODIFIED INVARIANT CURRENT BATTERY CHARGING METHOD AND APPARATUS

This application claims benefit of priority & continuation to U.S. provisional application No.60/094,164 filed Jul. 27, 1998.

This invention relates to a method of modifying the charging current of conventional charging system from invariant to pulse current.

BACKGROUND OF THE INVENTION

Conventionally, invariant current charging systems are currently recommended and supplied by equipment manufactures.

Invariant current charging systems invoke premature capacity loss of lead-acid batteries when combined with high rates of discharge and recharge. There are several factors that contribute to battery failures. They have a compounding affect. The decline in capacity is associated with a progressive change in the nature of the plates active material. The active material which starts out porous with low crystallinity changes to a less porous and a more defined crystallinity in the cycled mass. Conventional charging also invokes the growth of small crystals that completely blanket the surface of the plates. This resistive layer of lead oxide PBO is most responsible for the increased internal impedance of batteries.

Further decline in battery capacity due to reduced available re-active surface area and reduced battery acid strength result in lowered battery voltage output, result in softening and shedding of active material. Continued conventional charging results in excessive gassing, increased crystallization, increased operating temperature, resulting in physical damage to the battery caused by distortion due to crystal growth and resulting in heat damage due to internal impedance.

Inventors have previously proposed various types of pulsed voltage charging devices.

U.S. PATENT DOCUMENTS REFERENCES CITED

| | | |
|---|---|---|
| 5,063,341 | November 5, 1991 | Gali |
| 5,166,595 | November 24, 1992 | Laverich |
| 5,633,575 | May 27, 1997 | Gali |
| 5,648,714 | July 15, 1997 | Eryou |
| 5,677,621 | October 14, 1997 | Campagnuola |

OTHER PUBLICATIONS

G. D. Makar—D.C. charging systems, lead acid batteries and pulse charging

Battery Council International—Battery service manual

William J. (Bill) Glazier—Lead acid batteries

L. T. Lam—Journal of power sources 53 (1995) 215–228

D. Pavlov—Journal of power sources 46 (1993) 171

M. K. Dimitrov and D. Pavlov—Journal of power sources 46 (1993) 203

These patents and other documents describe devices that generate a series of voltage pulses. Pulses are applied to the charging circuit and battery. The electrical voltage pulses above charging voltage may or may not also pulse some current. It has been found that these devices that pulse only voltage have a net discharge effect. Those units that pulse volts and some current do tend to improve the charging characteristics of a conventional charging system. Crystallization is reduced. Battery open circuit voltage is improved. Parasitic load on the system does tend to increase due to the high amperage loads pulsed on some systems. High voltage spikes cause increased gassing. This may contribute to premature battery failure, especially in sealed non- serviceable type batteries. Higher frequency pulse devices cause electronic and radio interference.

SUMMARY OF THE INVENTION

It is one object of the present invention to provide an improved charging method for a battery.

According to the invention there is provided a method for charging a battery having at least one electrolytic cell so as to effect lowering of the internal impedance of the battery plates and increase battery cycle life capacity, the method comprising the steps of connecting a current source device across the positive and negative terminals of the battery and applying a periodic pulse to the device so as to apply a pulsed current across the battery terminals.

The invention provides the following advantages:

Charging time of battery is reduced.

Battery cycle life capacity is increased.

Conventionally charged battery capacity can be recovered.

Temperature variations play only a minor role in prolonging pulse charged battery endurance.

BRIEF DESCRIPTION OF THE DRAWINGS

One embodiment of the invention will now be described in conjunction with the accompanying drawings in which.

DETAILED DESCRIPTION

Figure 1:
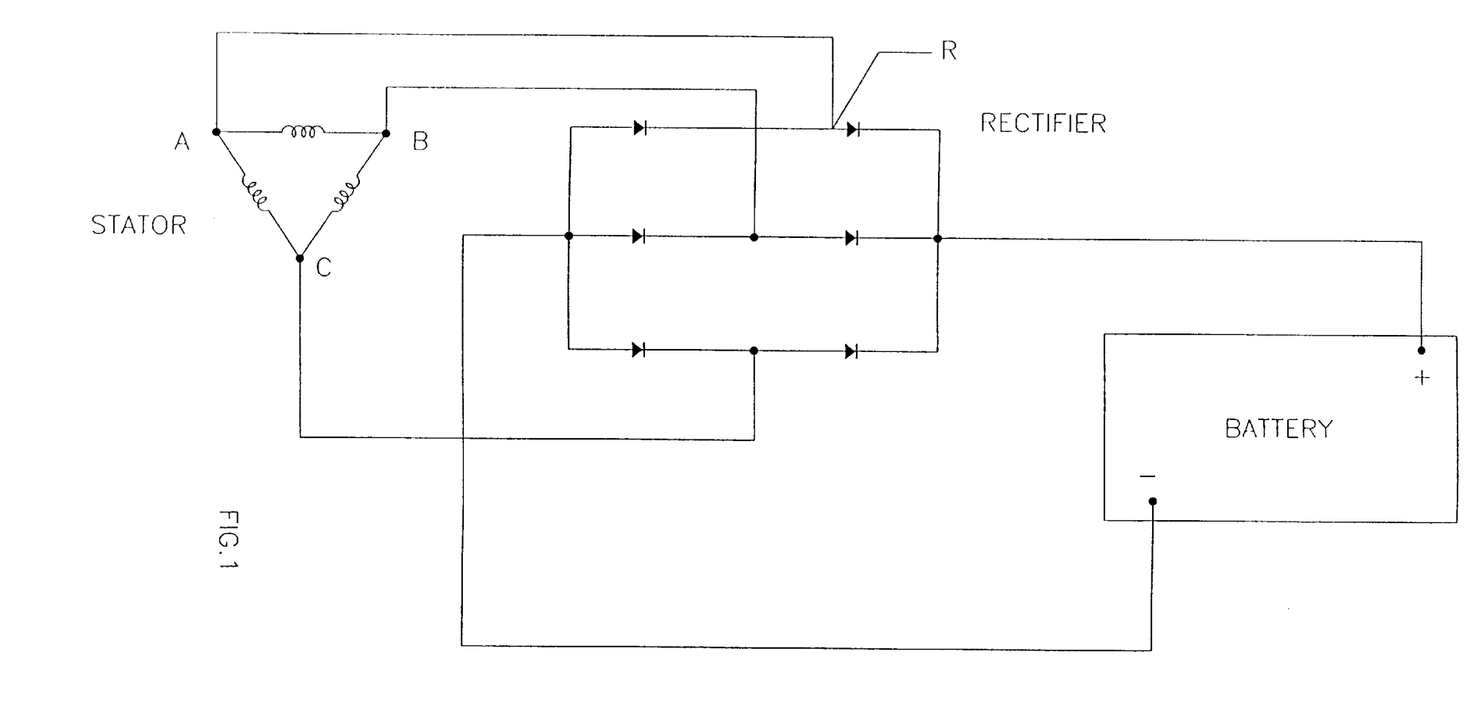
FIG. 1 is a schematic illustration showing a conventional charging system for a battery.
Figure 1A:
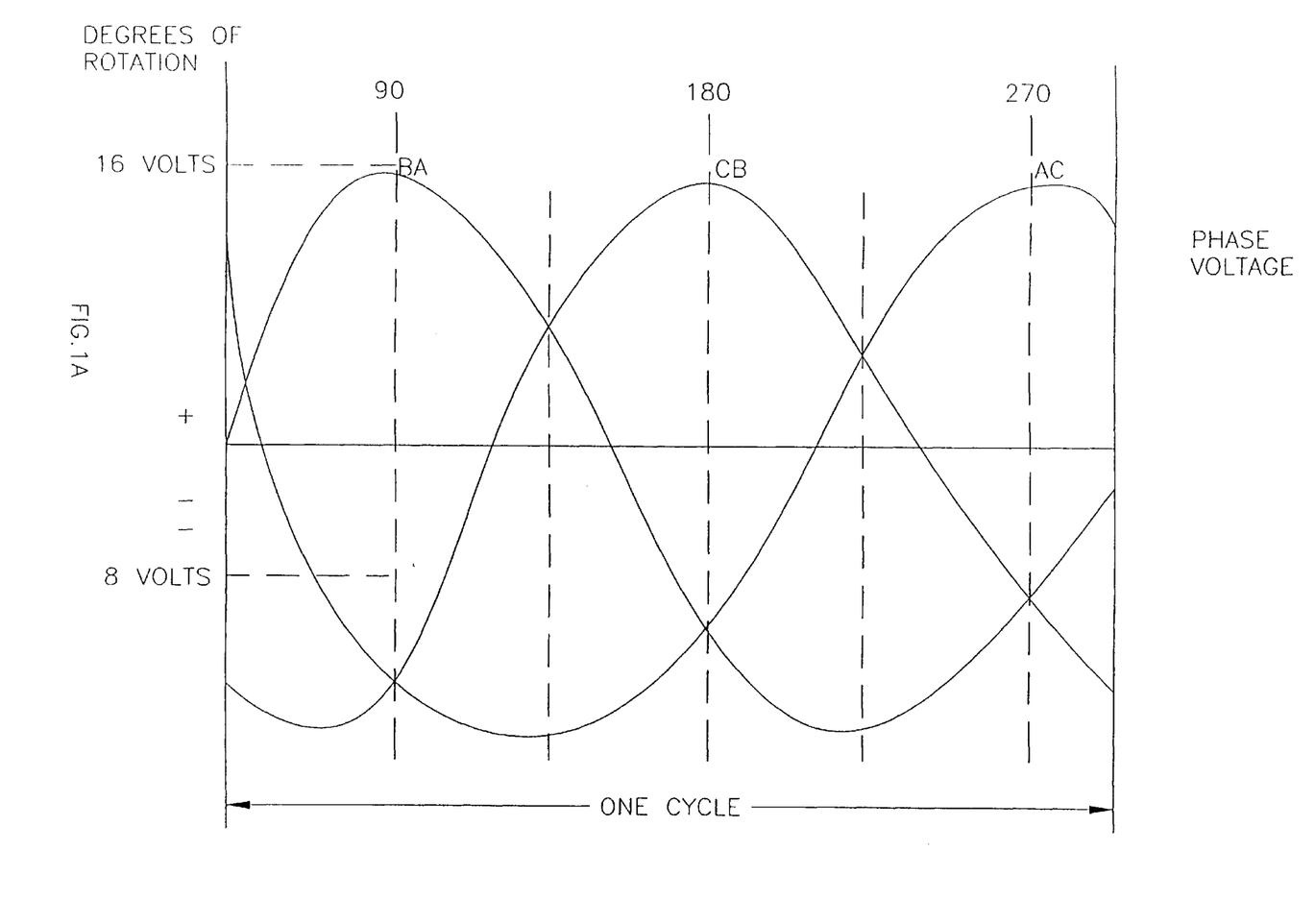
FIG. 1A is an illustration of the output from the circuit of FIG. 1

In FIG. 1 is shown a conventional six rectifier diode rectifying system for the invariant current sign wave action of a conventional charging system and shows in FIG. 1A one cycle of the voltage applied to the battery from the rectifier system.

Figure 2:
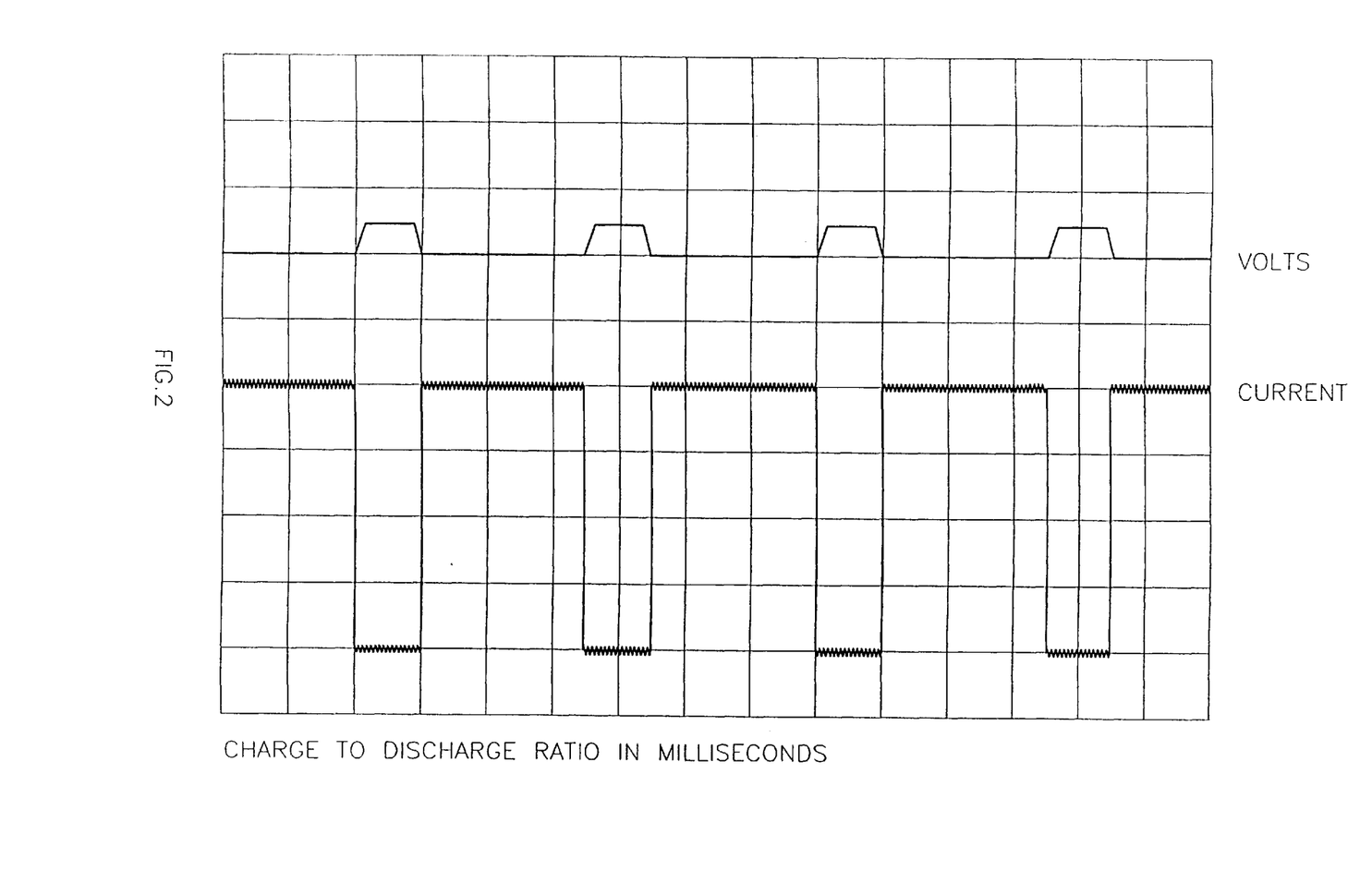
FIG. 2 is a graph showing the application of the pulse charge current according to the present invention.

In FIG. 2 there is shown the graph of voltage and current wave forms during pulse current charging of the battery. It will be noted that there is a sudden increase in voltage immediately when the pulse current is switched off. The voltage continues to rise steadily during the off-time. Similarly there is a sharp fall in voltage when the current is switched on.

Figure 3:
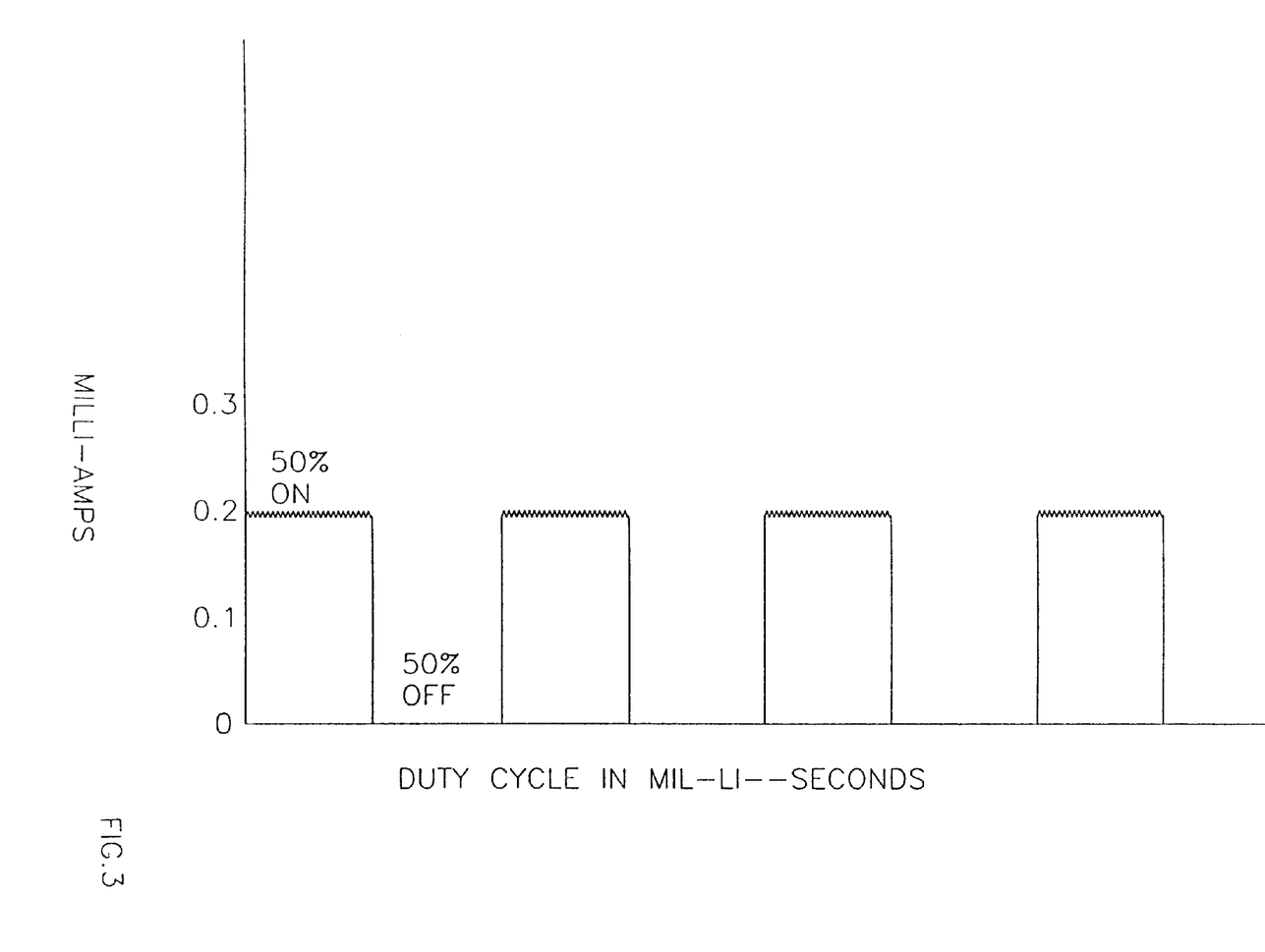
FIG. 3 is a graph showing the pulse charge current applied to the invariant charging current system.

FIG. 3 depicts a 200 milliamp current at 50% on/off duty cycle pulsed at a frequency of 2000 Hz according to the present invention.

Figure 4:
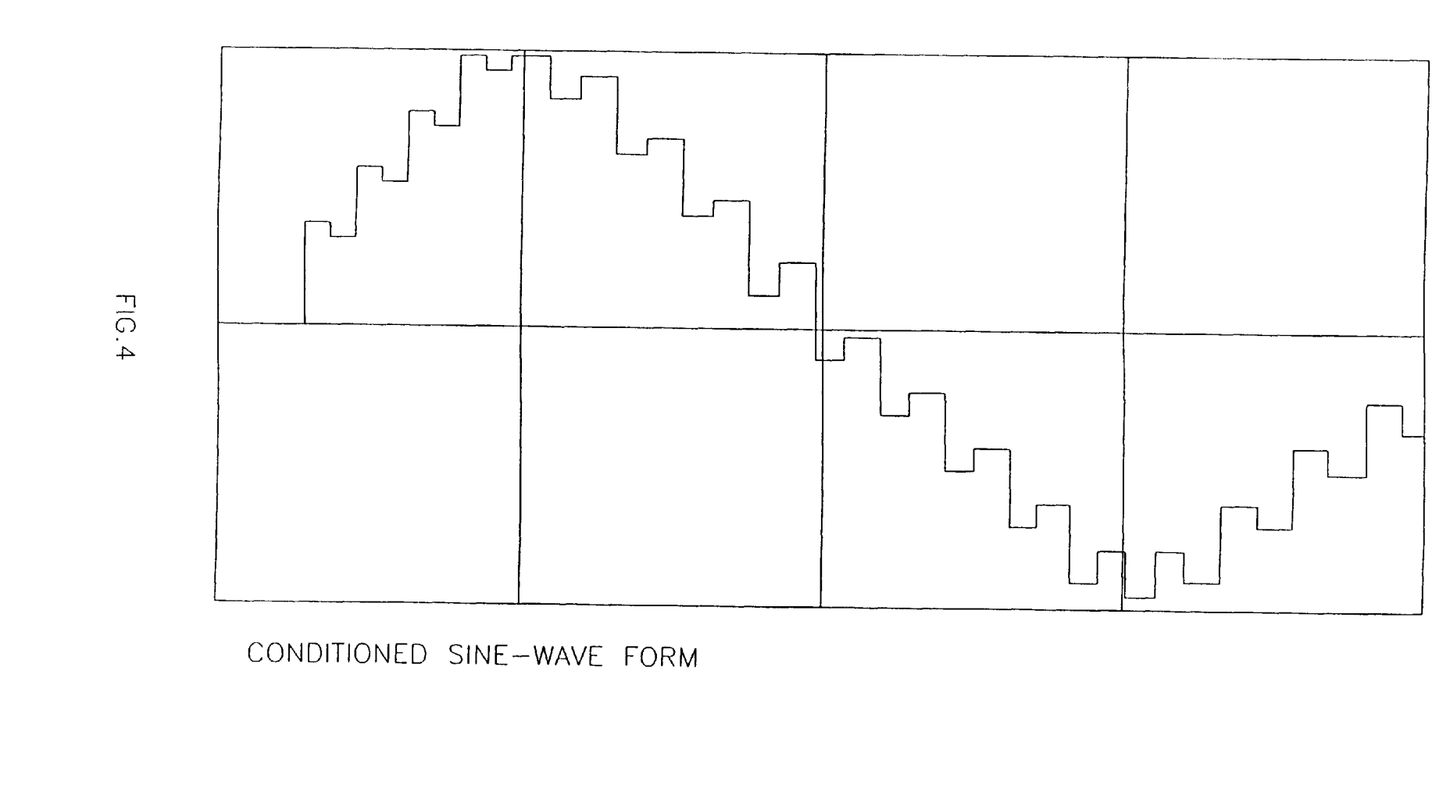
FIG. 4 shows an invariant current sign wave after application of the pulse current according to the present invention.
Figure 5:
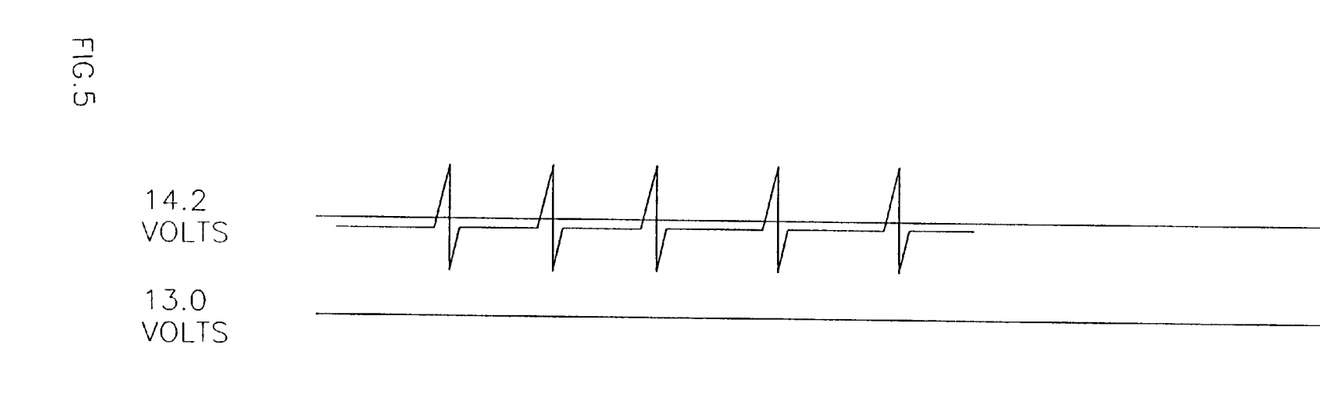
FIG. 5 is a graph showing the conditioned wave form at higher frequencies.

FIG. 4 shows the conditioned sign wave form at 0.2 amp current from the pulse current according to the present invention at 50% on/off duty cycle at 2000 Hz applied to an existing conventional sine wave.

Figure 6:
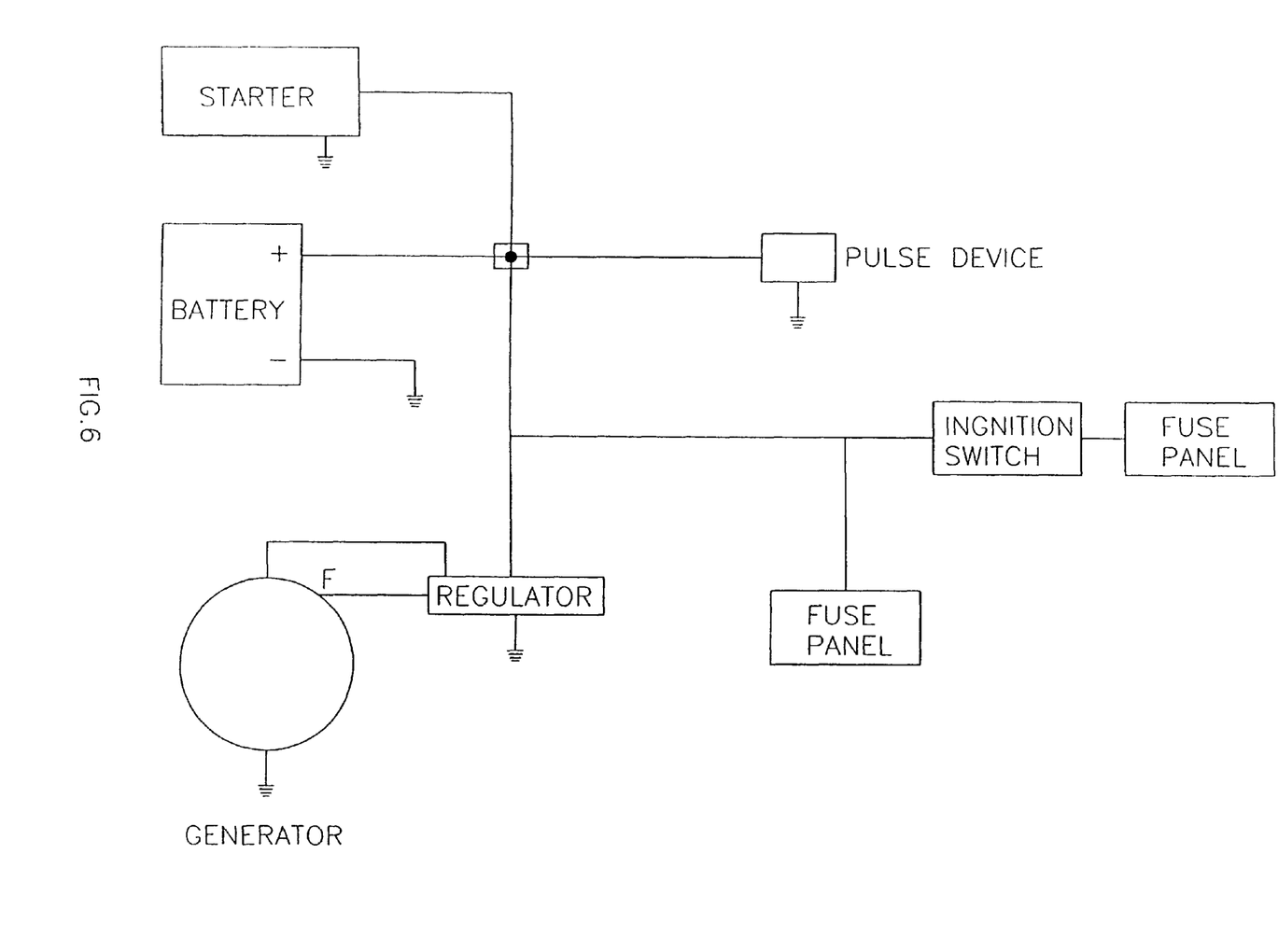
FIG. 6 is a schematic illustration showing the charging system of a vehicle with the pulsing device attached in parallel to the conventional charging system.

In FIG. 6 is shown the conventional charging system of the vehicle where the pulsed constant current source device is added in parallel to the charging system as applied to the positive terminal of the battery.

Figure 7:
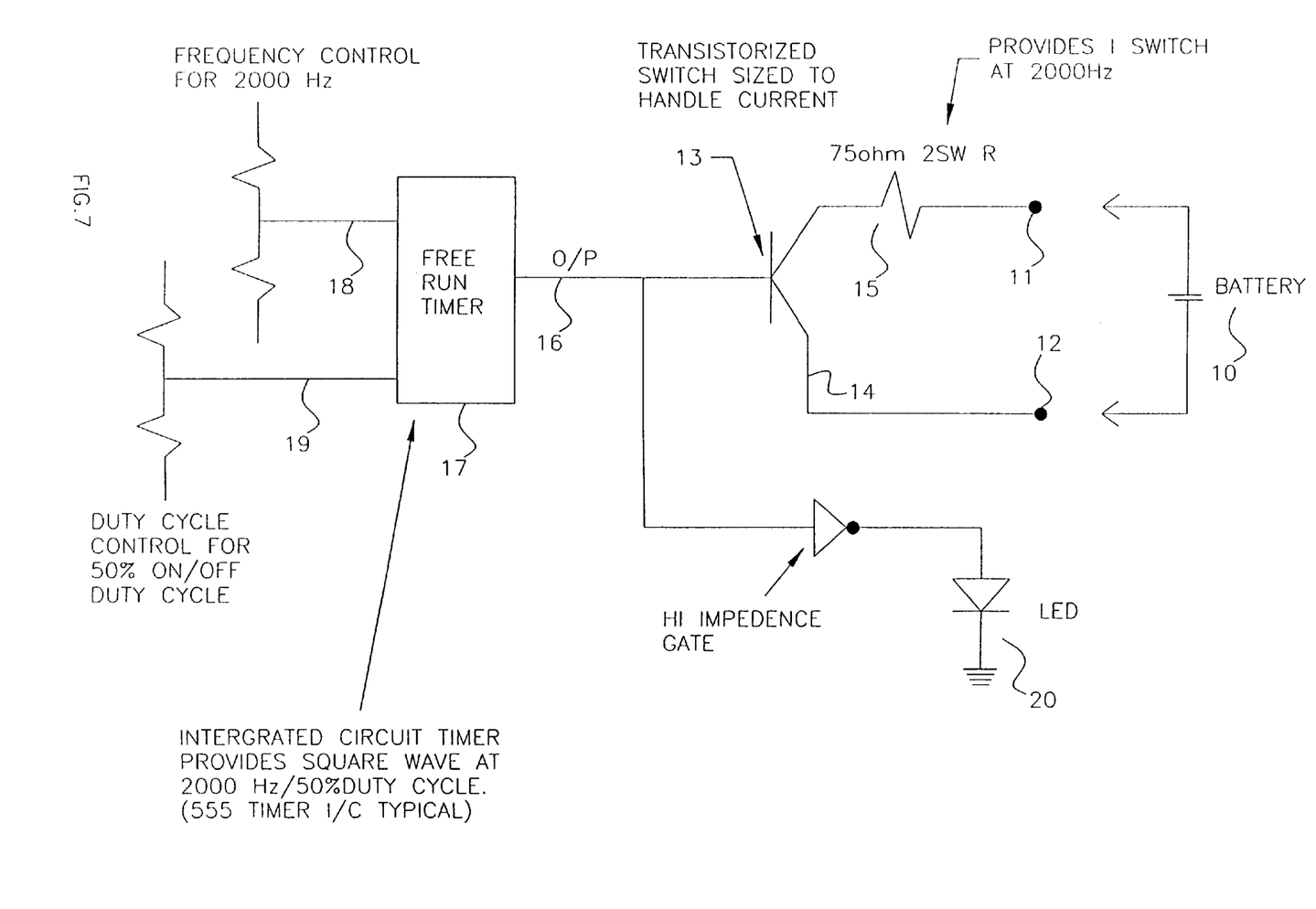
FIG. 7 is a schematic block diagram of the structure of the pulse current generating device of the present invention.
Figure 8:
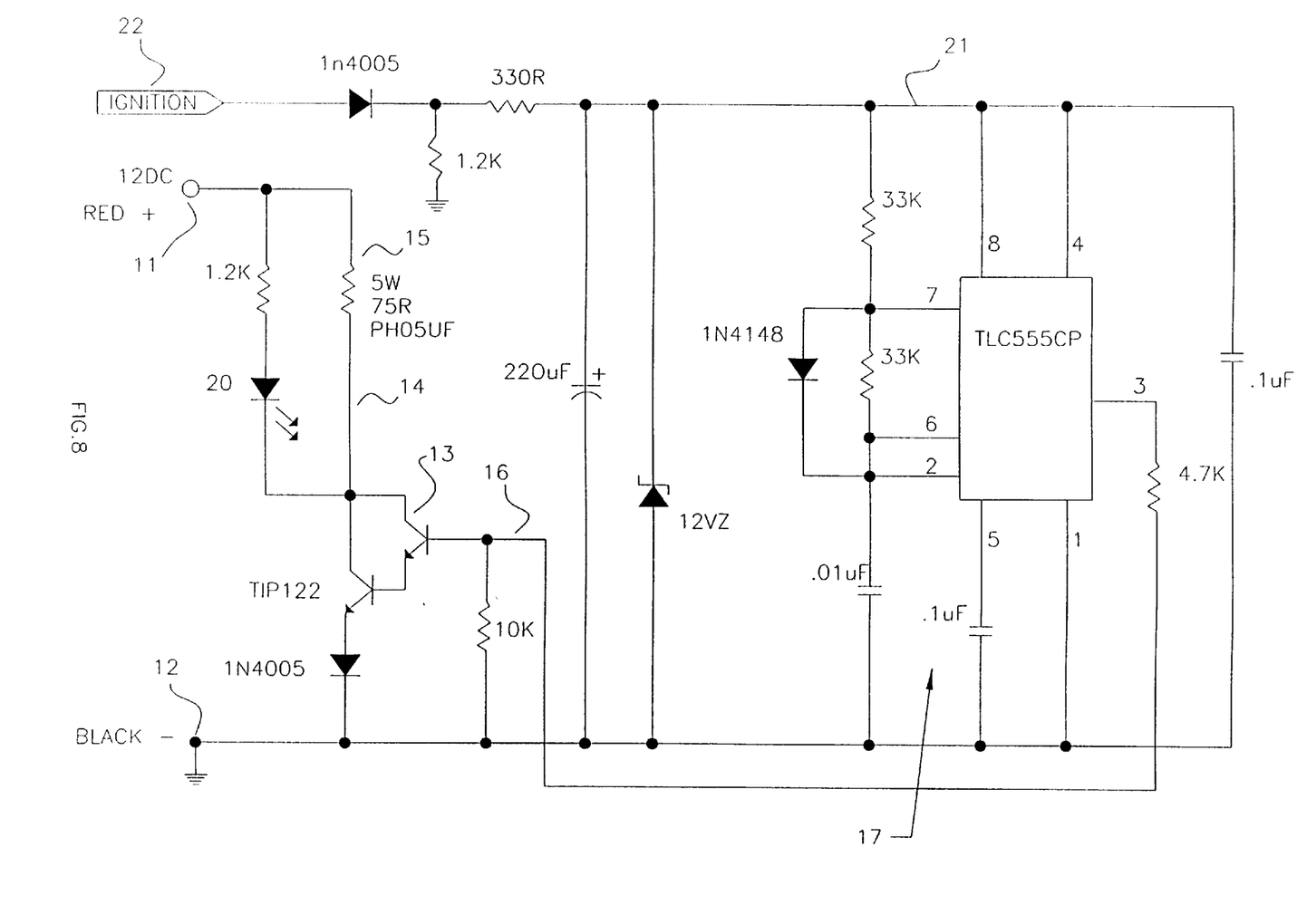
FIG. 8 is a schematic of the circuit of the pulse current generating device of FIG. 7.

In FIGS. 7 and 8 is shown the circuit schematic of the pulse current device. The device comprises a current source including an integrated circuit timer which provides a square wave at 2000 Hz 50% duty cycle. The output of the timer is applied to a transistor which controls a current source so that the current source at 0.2 amps is generated as a square wave at the control of the timer. The 0.2 amp current is applied to the battery as a square wave pulse.

In FIGS. 7 and 8 is shown the circuit arrangement for applying current pulses to a battery of an automobile to supplement the conventional charge current as shown hereinbefore.

The battery 10 is connected to terminals 11 and 12 to receive the charged pulses from the circuit device. A transistor switch 13 generates a predetermined or constant current on a line 14 connected across the battery terminals. The value of the current is determined by a resistor 15.

The transistor switch 13 is switched on and off by an input 16 from a timer circuit generally indicated at 17. The timer has inputs 18 and 19 which can be controlled to determine the frequency and duty cycle. In FIG. 7 these values are variable whereas in the arrangement of FIG. 8 they are predetermined by the arrangement of the circuits. A LED 20 is connected in the circuit so as to provide an indication when the pulse current is applied.

The transistor switch when actuated at the predetermined duty cycle provides a square wave output current of predetermined value which is applied across the battery terminals. The timer circuit 17 is actuated with power from a line 21 operated by the ignition 22 of the vehicle.

A pulsed current device without a corresponding pulsed voltage spike should provide all the desired positive effects without the harmful side effect of high voltage charging either invariant or pulsed.

The present invention therefore provides a device that converts the conventional charging current of an invariant current charging system to a hybrid pulsed current charger.

A prior device outside the scope of the present invention provided a pulsed voltage at 4 volts above rail and pulsed current at 0.2 amps at a duty cycle of 50% at a frequency of approximately 2000 Hz. The device was connected in parallel to an automobiles charging system at the battery. Any measurable significant improvement to the batteries condition were not noticeable for eight (8) days of normal vehicle operation. It took a month and a half to notice any sustained positive effects.

The pulsed voltage device was modified by removing from its circuitry the pulse volt spike of four (4) volts above rail voltage. The 0.2 amp. current pulse at 2000 Hz was left intact. The unit was once again connected in parallel to the charging system at the battery of the vehicle. By impressing this very small pulse current of 0.2 amps pulsed at a 50% duty cycle at a frequency of approximately 2000 Hz 'FIG 3', charging the battery at engine idle for 30 minutes produced significant detectable improvements to the batteries state of charge. This hybrid form of pulse current charging resulted in an immediate improvement to the batteries state of charge. The output voltage and load on the charging system were reduced. Devices with varying frequencies were tested. The same positive results were produced. The method is predictable, repeatable and sustainable. Internal impedance within a lead acid battery is reduced by this pulse current charging method. Gassing is greatly reduced when charging batteries. This pulse current charging method results in an improved hybrid type charge current.

FIG. 4 provides a conventional DC current which is rectified AC current that resembles a sine wave form. The hybrid pulse invariant charge current when viewed on the screen of a oscilloscope is seen as a castelated sine-wave action. Thus the frequency of the pulses is greater than that of the sine wave so as to be added onto the sine wave.

What the invention does is produce a hybrid invariant pulse charging current. The battery response in the same positive manner as it would to pulse current charging. The harmful effects of invariant current charging are removed.

The beneficial characteristics of pulse current charging are inherited.

By the impression of a very small pulsed current load at varying duty cycles and frequencies imposed onto conventional charging current, the battery reacts to the hybrid pulsed invariant charge current as it would to a pulse current charge. The small voltage fluctuations do not need to be dampened.

The pulse device can be wired into the charging circuitry between the battery and charging device output terminal. Frequencies ranging from 60 Hz to 10,000 Hz all producing the same effect.

Although a current of 200 ma was used the effect will be present in smaller currents. The upper limit will be set by the charge output and battery capacity. The duty cycles of load on/off could range from 1% load on 99% load off to 99% load on to 1% load off. The switched load could be an existing load i.e. day light running lights or could be a predetermined load built into the pulse circuit.

The invention therefore provides a method for lowering battery plates internal impedance and increase battery cycle life capacity. The method comprising the steps of connecting a pulse device to the positive and negative terminals of the battery having at least one electrolytic cell.

The method includes applying a substantially constant charging current across the positive and negative terminals. The current generated pulses are at a range of from detectable to the upper limits set by the charging output and battery capacity. The pulse frequency is selectable over a wide range but preferably is greater than the frequency of the base charger current so that it preferably ranges from 60 Hz to 100,000 Hz.

The duty cycles range from 1% on to 99% off to 99% on 1% off. The pulse device generates a square wave pulse current. The method includes applying these square wave pulses onto the invariant current charging output to the battery. This converts the invariant sine wave form charging current to one that resembles a castelated sine-wave form invariant charging current.

At higher frequencies the square wave changes to resemble a saw tooth wave.

This pulse current charging method is best suited, but not limited to lead acid type batteries.

The method provides an improved battery state of charge, stabilizing open circuit voltage and improved CCA and reserve capacity.

The method provides reduced gassing during charging and increases in shelf life of batteries in storage. Open circuit voltage and CCA capacity of pulsed charged batteries in storage tends to remain at a higher charge over the same period of time, when compared to conventionally charged batteries stored in the same proper manner.

The method extends battery life cycle performance. The application of pulse current charging to a cycled battery at 80% capacity can invoke a recovery of the batteries capacity. Batteries at 60% capacity can be maintained at that level of capacity. Batteries below 60% are not recoverable. Pulse current charging is best recommended for firming up the active material in the battery plates.

The capacity loss of batteries due to crystallization is reduced. Capacity loss is governed by a progressive change of the active material. A state of low crystallinity of the active material in the cycled mass is maintained. Both the specific surface area and the electrochemical reactivity of the battery acid are maintained at optimum.

The barrier layer of PBO immediately adjacent to the plates is reduced by pulse current charging. This barrier layer exerts the dominant effect on capacity loss. By minimizing the growth of the PBO barrier layer battery capacity is maintained.

It has also been found as a consequence of this invention that internal combustion engines using the ignition combustion principal have been found to be more responsive when the electrical system was using the pulse current charging technique. Combustion temperature is increased due to a hotter ignition spark. Fuel is burnt more completely, emission are lowered, fuel mileage is increased.

Pulse current charging though the better charging method, is not recommended to power electrical loads. Pulse current charging cannot recover batteries that have physical damage.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A method for charging a battery having at least one electrolytic cell so as to effect lowering of the internal impedance of the battery plates and increase battery cycle life capacity, the method comprising the steps of:

connecting a current source device across the positive and negative terminals of the battery;

connecting in parallel to the current source a load;

switching the load at predetermined duty cycles and frequency to produce a negative draw on the current source so as to superimpose a periodic pulse on to the charging current generated by the current source so as to apply a pulsed current across the battery terminals to thereby charge the battery.

2. The method according to claim 1 wherein the current pulses generated by the load are at a range of from detectable to the upper limits set by the charging output and battery capacity.

3. The method according to claim 1 wherein the frequency of the switching ranges from 60 Hz to 100,000 Hz.

4. The method according to claim 1 wherein the duty cycle of the switching of the load ranges from 1% on to 99% off to 99% on 1% off.

5. The method according to claim 1 wherein the switching of the load generates a square pulse current waveform.

6. The method according to claim 5 wherein the square pulse current waveform is applied onto an invariant current charging output to the battery.

7. The method according to claim 6 wherein the invariant charging current output is a sine wave such that the square pulse current waveform converts the invariant charging current to one that resembles a castelated sine-wave form.

8. The method according to claim 1 wherein the battery is a lead acid battery method according to claim 1 wherein the pulse waveform is generated by an on and off control switched load at predetermined duty cycles and frequencies. The load is connected to the battery terminals so as to receive power there from.

9. The method according to claim 1 wherein the load is connected to the battery terminals so as to receive power therefrom.

* * * * *